H. R. PALMER.
GLARE CONTROLLING DEVICE FOR LAMPS.
APPLICATION FILED OCT. 10, 1916.
1,269,548.
Patented June 11, 1918.
2 SHEETS—SHEET 1.
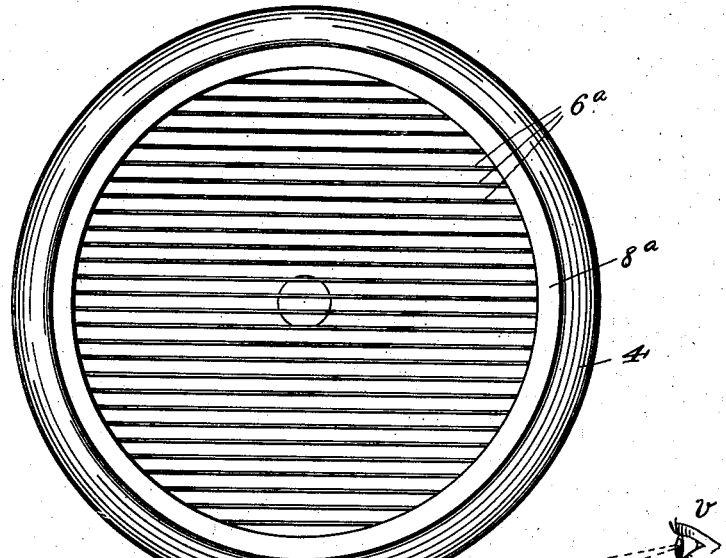
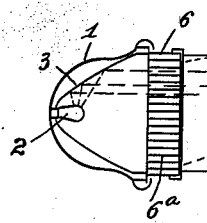
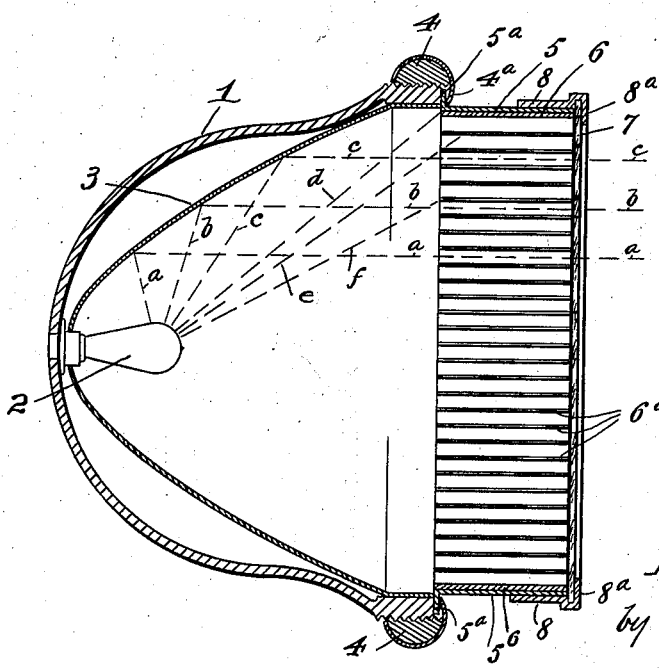
Inventor
Herbert R. Palmer H. R. PALMER.
GLARE CONTROLLING DEVICE FOR LAMPS.
APPLICATION FILED OCT. 10, 1916.

1,269,548.

Patented June 11, 1918.
2 SHEETS—SHEET 2.

Inventor
Herbert R. Palmer
by Francis P. Griswold
Atty.

UNITED STATES PATENT OFFICE.

HERBERT R. PALMER, OF CLEVELAND, OHIO.

GLARE-CONTROLLING DEVICE FOR LAMPS.

1,269,548.  Specification of Letters Patent.  Patented June 11, 1918.

Application filed October 10, 1916. Serial No. 124,860.

*To all whom it may concern:*

Be it known that I, HERBERT R. PALMER, a citizen of the United States, residing at Cleveland, in the county of Cuyahoga and State of Ohio, have invented a new and useful Improvement in Glare - Controlling Devices for Lamps, of which the following is a specification.

This invention relates to lamps in general and in particular to lamps used on automobiles, motor-cycles, motor-boats, and like vehicles, and it has especial reference to means for controlling the annoying glare of said lamps. Confidence, convenience, and safety in traveling at night requires that vehicles be equipped with so-called head-lights for illuminating the road in advance. The lamps in common use for this purpose are provided with a parabolic reflector located back of the light member for projecting the rays over a more or less broad and extended field in advance of the vehicle, depending on the curvature of the reflector, the area of the face of the lamp, and the power of the light member. While the modern lamps are efficient in lighting the way in advance of the vehicle, the glare which they produce is very annoying to persons facing said vehicles, and particularly so to occupants of vehicles traveling in the opposite direction. This annoyance is so pronounced that various means have been devised and are employed for dimming the lights, thereby decreasing the glare, but by so doing greatly reducing the efficiency of the lamp for its intended purpose.

The object of the present invention is the provision of simple and effective means for automatically obviating or deflecting the glare without materially decreasing the illuminating effect of the lamp, thereby eliminating an undesirable feature without interfering with the desired functions common to lamps used for the purpose hereinbefore mentioned.

With the said object in view the invention consists in the combination, construction, and arrangement of the elements of a device that is connected with the lamp and in combination therewith produces the desired result as hereinafter described and pointed out definitely in the claims.

Figure 4:
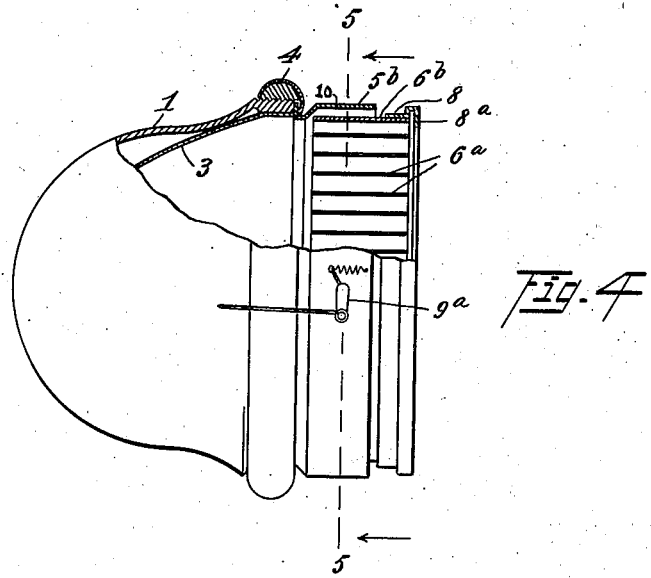
Figure 5:
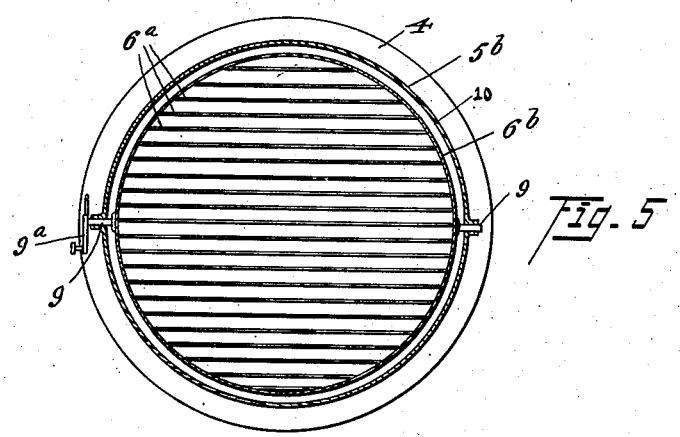
Figure 6:
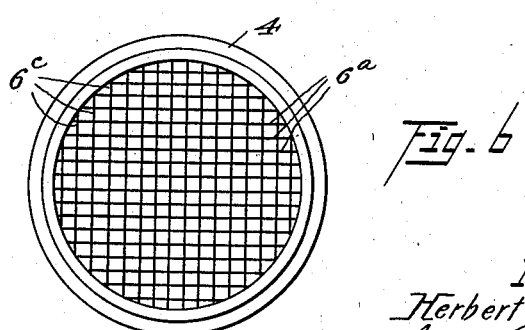

The principles of the improvement and the means for carrying out the same will be understood from the following specification with reference to the accompanying drawings which form a part thereof and wherein Figure 1 is a front or face view of an automobile lamp embodying the invention. Fig. 2 is a central vertical section. Fig. 3 is a diagrammatical illustration of the principles on which the invention is founded. Fig. 4 is a view partially in central vertical section of an adjustable form of the improved device. Fig. 5 is a section on line 5—5 of Fig. 4, and Fig. 6 illustrates the front of a modified form of the invention.

To facilitate the understanding of the device and its operation, similar characters of reference are employed to designate similar parts throughout the drawings and specification.

Referring now to the illustrated simple embodiment of a vehicle lamp, 1 represents the ordinary lamp case or housing, 2 the lamp located, as is the common practice, in the center and in front of a concave parabolic reflector 3. In the construction of the most satisfactory vehicle lamps at present in common use, a plain glass front is secured in the housing 2 by an annular ring 4 threaded onto said housing and provided with an overlapping flange 4ª which bears on the exterior of the glass member. In the improved lamp the aforesaid identical elements are employed and their relative arrangement is the same with the exception of the glass front member which occupies a different position as will hereinafter be brought out.

In the type illustrated in Figs. 1 and 2 a tubular member or sleeve 5, of predetermined suitable longitudinal dimension, is provided with a flange 5ª for attachment to the housing 1 through the medium of the ring 4, the said flange 5ª taking the place of the glass front member of the ordinary construction. Snugly fitting within the sleeve 5 and preferably of the same longitudinal dimension as said sleeve is a tubular shell 6 having a series of longitudinally extending plates 6ª permanently attached thereto and arranged in parallel horizontal planes a predetermined equi-distance apart. A glass front or cover member 7 is connected with the sleeve 5 by the ring 8 provided with an annular overlapping flange 8ª.

Referring now to Figs. 4 and 5, it will be found that the principles embodied are the same, but the construction is modified for the purpose of adjustment to suit different conditions. This is particularly applicable to automobile lamps. When in cities or more or less thickly populated sections it is desirable to direct the light so that it will strike the highway at a less distance from the car than when traveling over country roads. To meet these conditions the tubular member 6ᵇ is provided with trunnions 9 and is mounted in the member 5ᵇ, the clearance 10 allowing the member 6ᵇ to be tilted and thereby change the direction or angle of the light rays. One of the trunnions 9 is provided with a crank 9ᵃ or other suitable means for the tilting operation.

It will be seen that light rays radiating from the light source 2 are confined within the circumference of the member 6, and the field of direct and reflected light is controlled by the area within this circumference. Glare is the result of direct and reflected rays of light striking the retina of the eye in a direct line, and if these rays are intercepted or diverted the glare is cut out; in other words, the eye or point of vision must be within the field covered by direct and reflected rays.

Rays from the light source 2 striking the reflector 3 are deflected and take the direction of lines *a, b, c*, while rays that pass beyond the reflector radiate in direct lines *d, e, f* and if not intercepted, extend to a broad field, and the eye located at any point within this field will receive the glare. The plates 6ᵃ provide intercepting or checking means for the rays of light falling beyond the reflector, therefore the vertical and horizontal field of direct light rays is limited to the area of the face of the lamp and as the glare is produced only in this field, or between the lines *m* and *n* Fig. 3, it will not be apparent if the point of vision is outside as at *v*. If the point of vision is located anywhere between lines *m* and *n* the eye will receive the glare, but if located at any point outside the area bounded by lines *m* and *n* the streak of light will be visible without the glare.

There are other rays to be contended with besides the direct and reflected rays emanating directly from the light member, rays for convenience will be designated as false rays; these are the result of the light member being reflected and the rays from this reflection take different angles from those of the direct rays. The glare from false rays is controlled as well as the true rays, as the glare cannot strike the eye unless the light member or the reflector is visible from the point of vision. By referring to Fig. 3 it will be seen that the improved device positively conceals the light member 2 and the reflector 3 when the point of vision is outside the field embraced within the lines *m* and *n*. The members 6ᵃ are so arranged that the line of sight is intercepted. In passing the edge of one plate it is intercepted by another.

In the modified form shown in Fig. 6, longitudinal cross plates 6ᶜ are employed, thereby forming with the plates 6ᵃ a longitudinally extending grille in the member 5. The glare controlling principle is identical with that hereinbefore explained.

As it is the general practice to locate the lamps on vehicles some distance below the points of vision, or the eyes of the occupants, and while this distance may vary in different types of vehicles, it rarely, if ever, occurs that the horizontal line of vision falls within the field of light controlled by the improved device when made a part of the lamp.

In practice the longitudinal plates 6ᵃ and 6ᶜ are extremely thin; therefore the vertical and horizontal area which they occupy does not materially reduce the volume of light or decrease the efficiency of the lamp for the desired purpose of lighting the way in advance of the vehicle.

While the foregoing description has reference to only two forms of deflecting means, it will be understood that the invention is not confined to this specific construction, as a series of longitudinally extending openings of any shape in cross section and covering the front opening in the lamp casing would perform the desired function of deflecting the rays and thereby controlling the glare.

What I claim and desire to secure by Letters Patent is:

1. A glare controlling device for lamps, comprising a longitudinal extension attached to the front of the lamp, a longitudinal tubular member mounted in said extension, whereby it is adapted to rock, longitudinal partitions permanently attached to the interior of the rockable tubular member, and means for rocking said tubular member.

2. In a vehicle lamp the combination of a light member provided with a reflector; a casing in which said light member is housed, said casing being open in front of the light member; a longitudinal open extension member projecting outward from the front of the lamp casing; a tubular member mounted in said extension whereby it is adapted to rock, longitudinal partitions permanently attached to the interior of the rockable tubular member, said partitions forming a series of longitudinal cells; and means for rocking said tubular member.

3. In a vehicle lamp the combination of a light member provided with a reflector; a casing in which said light member is housed, said casing being open in front of the light member; a longitudinal open extension member projecting outward from the front of the lamp casing; a tubular member mounted in said extension whereby it is adapted to rock, longitudinal partitions permanently attached to the interior of the rockable tubular member, said partitions forming a series of longitudinal cells; a transparent cover member over the outer end of said tubular member; and means for rocking said tubular member.

4. In a vehicle lamp in combination with the casing thereof a longitudinal extension member projecting outward from said casing from the open front thereof and having an oscillating connection therewith; longitudinal partitions fixed in said extension member, said partitions forming a series of longitudinal cells.

HERBERT R. PALMER.